United States Patent
Varreng

Patent Number: 6,125,534
Date of Patent: Oct. 3, 2000

[54] METHOD OF MAKING A CABLE JOINT

[75] Inventor: Jan Sverre Varreng, Oslo, Norway

[73] Assignee: Alcatel, Paris, France

[21] Appl. No.: 09/087,075

[22] Filed: May 29, 1998

[30] Foreign Application Priority Data

Jun. 16, 1997 [EP] European Pat. Off. ............ 97401365

[51] Int. Cl.[7] .................................................. H01R 43/00
[52] U.S. Cl. ................................ 29/869; 29/868; 29/862; 174/71 R
[58] Field of Search ........................ 29/869, 868, 862; 174/94 R, 84 R, 71 R; 264/262

[56] References Cited

U.S. PATENT DOCUMENTS

| | | | |
|---|---|---|---|
| 3,852,516 | 12/1974 | Vander Ploog et al. ............... | 174/71 R |
| 4,057,187 | 11/1977 | Cranston et al. ........................ | 228/107 |
| 4,105,278 | 8/1978 | Braund et al. ...................... | 339/103 M |
| 4,241,004 | 12/1980 | Hervig .................................... | 264/262 |
| 4,289,721 | 9/1981 | Ishise . | |
| 4,377,547 | 3/1983 | Hervig . | |
| 4,484,022 | 11/1984 | Eilentropp ............................. | 174/84 R |
| 4,485,269 | 11/1984 | Steinberg .................................. | 174/84 |
| 4,487,994 | 12/1984 | Bahder .................................. | 174/73 R |
| 4,615,114 | 10/1986 | Jones et al. ................................. | 29/858 |
| 4,701,117 | 10/1987 | Takaoka et al. ......................... | 425/116 |
| 4,797,510 | 1/1989 | Mihelich ................................ | 174/94 R |
| 5,231,249 | 7/1993 | Kimura et al. ..................... | 174/105 SC |
| 5,234,515 | 8/1993 | Sekkelsten .................................. | 156/49 |
| 5,537,742 | 7/1996 | Le et al. ..................................... | 29/869 |
| 5,875,547 | 3/1999 | Larsson ..................................... | 29/869 |
| 5,925,852 | 7/1999 | Hinz et al. ............................. | 174/65 R |

FOREIGN PATENT DOCUMENTS

WO 86/02210 A1  4/1986  WIPO .

*Primary Examiner*—Carl J. Arbes
*Assistant Examiner*—Minh Trinh
*Attorney, Agent, or Firm*—Ware, Fressola, Van der Sluys & Adolphson LLP

[57] ABSTRACT

The present invention relates to method for making a joint between two polymer insulated power cables (3,4) including the steps of jointing the two bare cable conductors (1,2) and placing a heat sink device over the joint. The method includes injection molding a sheath (9) of semiconducting polymer material over the conductor joint (5) in fully bonded/welded contact (12,13) with the polymer insulation on the two cable ends (3,4) to prevent shrinkback of the insulation and to provide the heatsink.

3 Claims, 1 Drawing Sheet

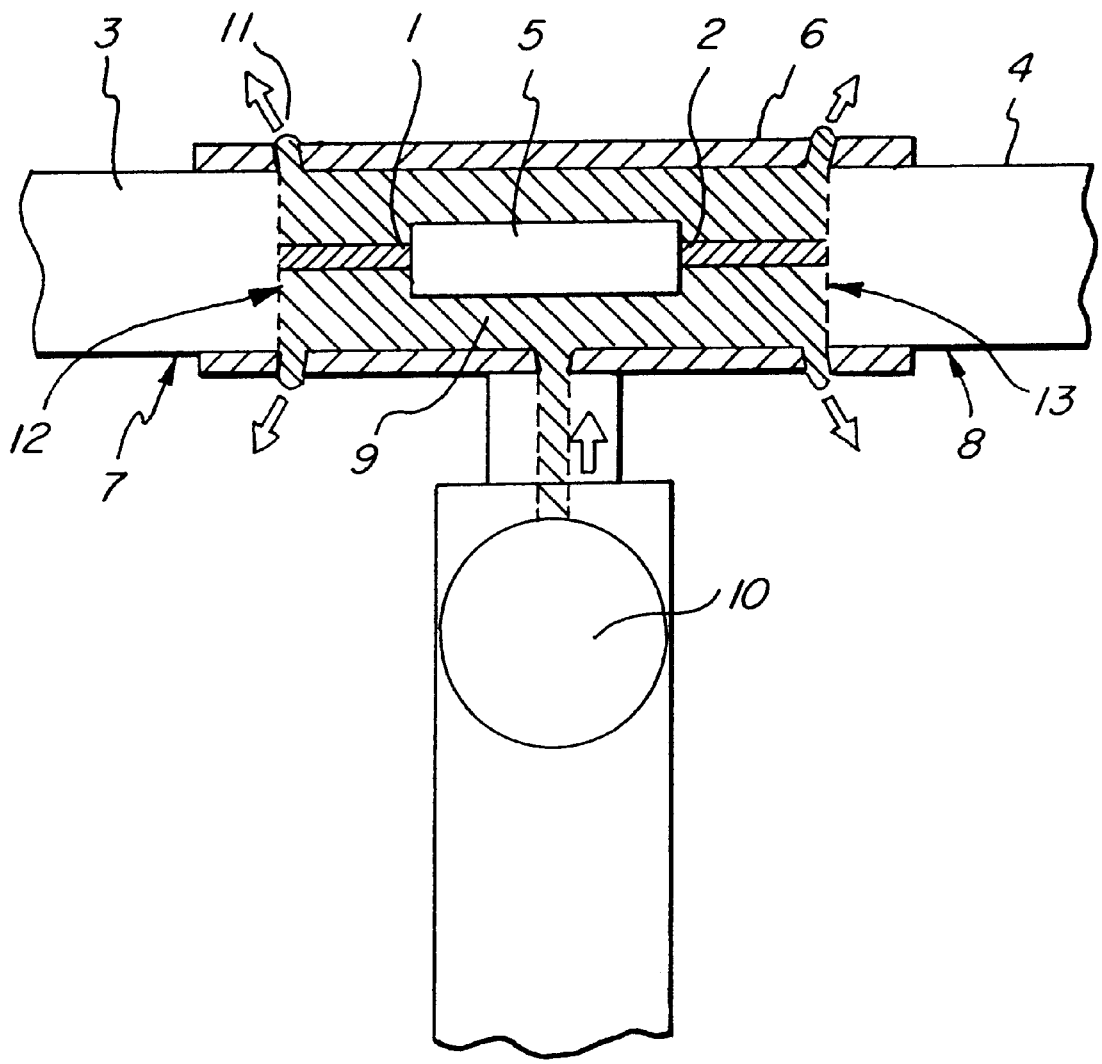

METHOD OF MAKING A CABLE JOINT

BACKGROUND OF THE INVENTION

1. Technical Field

The present invention relates to jointing of electrical power cables and in particular to jointing of polymer insulated cables. The jointing technique includes jointing of the two bare cable conductors and reconstructing the insulation and semiconductive layers over the conductor joint.

2. Description of the Prior Art

A technical problem is to install a heat sink device over the conductor joint, and prevent shrinkback of the cable insulation in the completed joint. A solution to this problem is described in WO 86/02210 where shrinkback is prevented by anchoring a special metallic heat sink device in the polymer insulation sheaths on both sides of the conductor joint. Special grooves are premade in the insulation material to fit inner ridges of the heat sink device. Making of suitable grooves do, however, require special cutting tools.

SUMMARY OF THE INVENTION

The object of the present invention is to provide an alternative and simpler solution to the known problem. The basic idea is to avoid the metallic heat sink device and avoid cutting into the insulation sheaths. The main features of the invention are defined in the claims. The solution is quick and requires no special cutting tools.

After jointing the two conductors in a jig, an injection molding form is placed around the conductor joint and over the cable insulation ends. All space within the form is then filled with semiconductive polymer by flushing the compound through said space until all parts have the same temperature and the semiconductive compound is fully united with the polymer insulation sheaths. This solution is simple, provides a suitable heat sink and a more flexible joint. Only a portable extruder is required.

Above mentioned and other features and objects of the present invention will clearly appear from the following detailed description of embodiments of the invention taken in conjunction with the drawing.

BRIEF DESCRIPTION OF THE DRAWING

The FIGURE is a cable joint (broken away to show internal structure) as it is being formed by the method of the present invention.

DETAILED DESCRIPTION OF THE INVENTION

The drawing schematically illustrates the principles of the method of this invention. The conductors 1 and 2 of two crosslinked polyethylene insulated power cables 3 and 4 are jointed in a jointing device 5. Thereafter an injection molding form 6 is placed over the joint in contact with the outer surfaces of the insulation sheaths 7 and 8. Semiconductive compound 9 compatible with the polymer of the insulation sheaths is injected into the molding form 6 from an injection extruder 10 until overflow compound appears at outlets such as indicated at 11 at a temperature sufficient to crosslink the compound and to obtain full unification with the cable insulation at the interfaces 12 and 13.

The form 6 is then removed, superfluous semiconductive compound is removed and the joint is finalized in the usual manner with insulation and outer covers. The semiconductive compound 9 which is fully bonded and welded to the conductor insulation effectively prevents a shrinkback of the polymer insulation and functions as a heat sink for the joint.

The above detailed description of embodiments of this invention must be taken as examples only and should not be considered as limitations on the scope of protection.

What is claimed is:

1. Method for making a cable joint comprising the steps of:
   (a) providing two power cables, each having polymer insulation and a bare cable conductor end;
   (b) joining the bare cable conductor ends of the two power cables to create a conductor joint; and
   (c) injection molding a sheath of semiconducting polymer material over the conductor joint in fully bonded/welded contact with the polymer insulation on the two power cables to prevent shrinkback of the polymer insulation and to provide a heat sink.

2. Method as claimed in claim 1, wherein each of the power cables has a polymer insulation end face, the semiconducting polymer material is in fully bonded/welded contact with the polymer insulation of the polymer insulation end faces of the power cables.

3. Method as claimed in claim 1, wherein the sheath of semiconducting polymer material fully encapsulates the conductor joint.

* * * * *